(12) United States Patent
Wang et al.

(10) Patent No.: US 12,323,317 B2
(45) Date of Patent: Jun. 3, 2025

(54) PROVIDING BORDER GATEWAY PROTOCOL DETERMINISTIC PATH FORWARDING

(71) Applicant: Juniper Networks, Inc., Sunnyvale, CA (US)

(72) Inventors: Kevin Wang, Acton, MA (US); Michal Styszynski, Antony (FR); Wen Lin, Andover, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/457,626

(22) Filed: Aug. 29, 2023

(65) Prior Publication Data
US 2025/0080450 A1 Mar. 6, 2025

(51) Int. Cl.
*H04L 45/02* (2022.01)
(52) U.S. Cl.
CPC .................................. *H04L 45/02* (2013.01)
(58) Field of Classification Search
None
See application file for complete search history.

(56) References Cited

U.S. PATENT DOCUMENTS

| | | | | |
|---|---|---|---|---|
| 8,958,286 | B1 * | 2/2015 | Atlas | H04L 12/18 370/227 |
| 2021/0367883 | A1 * | 11/2021 | Zhang | H04L 41/122 |
| 2021/0385150 | A1 | 12/2021 | Shrivastava | |

FOREIGN PATENT DOCUMENTS

EP 3873042 A1 9/2021

OTHER PUBLICATIONS

Chan L., "Color Operation with BGP Label Unicast draft-chan-idr-bgp-lu2-04.txt," Internet Engineering Task Force, Aug. 2021, pp. 1-12, XP015147546, Retrieved from the Internet:[URL:https://tools.ietf.org/html/draft-chan-idr-bgp-lu2-04] [retrieved on Aug. 27, 2021].
Extended European Search Report for Application No. EP23202743.3, mailed on Feb. 23, 2024, 15 pages.
Rao D., et al., "BGP Color-Aware Routing (CAR) draft-dskc-bess-bgp-car-05," Internet Engineering Task Force, Jul. 2022, pp. 1-54, XP015152622, Retrieved from the Internet: [URL:https://tools.ietf.org/html/draft-dskc-bess-bgp-car-05] [retrieved on Jul. 6, 2022].

* cited by examiner

*Primary Examiner* — June Sison
(74) *Attorney, Agent, or Firm* — Harrity & Harrity, LLP (57) ABSTRACT

A network device may originate a route, and may designate the route as a first colored route having a first color. The network device may advertise the first colored route to a first intermediate network device to cause the first intermediate network device to propagate the first colored route to an ingress network device over a first colored border gateway protocol session. The network device may designate the route as a second colored route having a second color, and may advertise the second colored route to a second intermediate network device to cause the second intermediate network device to propagate the second colored route to the ingress network device over a second colored border gateway protocol session.

20 Claims, 10 Drawing Sheets

PROVIDING BORDER GATEWAY PROTOCOL DETERMINISTIC PATH FORWARDING

BACKGROUND

Border gateway protocol (BGP) is a standardized exterior network device protocol designed to exchange routing and reachability information among autonomous systems on the Internet. BGP is classified as a path-vector routing protocol that makes routing decisions based on paths, network policies, rule sets, and/or the like.

SUMMARY

Some implementations described herein relate to a method. The method may include originating a route, and designating the route as a first colored route having a first color. The method may include advertising the first colored route to a first intermediate network device to cause the first intermediate network device to propagate the first colored route to an ingress network device over a first colored border gateway protocol session. The method may include designating the route as a second colored route having a second color, and advertising the second colored route to a second intermediate network device to cause the second intermediate network device to propagate the second colored route to the ingress network device over a second colored border gateway protocol session.

Some implementations described herein relate to a network device. The network device may include one or more memories and one or more processors. The one or more processors may be configured to originate a route, and designate the route as a first colored route having a first color and selected from a plurality of first colored routes. The one or more processors may be configured to advertise the first colored route to a first intermediate network device to cause the first intermediate network device to propagate the first colored route to an ingress network device over a first colored border gateway protocol session. The one or more processors may be configured to designate the route as a second colored route having a second color and selected from a plurality of second colored routes, and advertise the second colored route to a second intermediate network device to cause the second intermediate network device to propagate the second colored route to the ingress network device over a second colored border gateway protocol session.

Some implementations described herein relate to a non-transitory computer-readable medium that stores a set of instructions. The set of instructions, when executed by one or more processors of a network device, may cause the network device to originate a route, and designate the route as a first colored route having a first color. The set of instructions, when executed by one or more processors of the network device, may cause the network device to advertise the first colored route to a first intermediate network device to cause the first intermediate network device to propagate the first colored route to an ingress network device over a first colored border gateway protocol session. The set of instructions, when executed by one or more processors of the network device, may cause the network device to designate the route as a second colored route having a second color, and advertise the second colored route to a second intermediate network device to cause the second intermediate network device to propagate the second colored route to the ingress network device over a second colored border gateway protocol session. The set of instructions, when executed by one or more processors of the network device, may cause the network device to designate the route as a multicolored route having multiple colors, and advertise the multicolored route to one of the first intermediate network device or the second intermediate network device over the first colored border gateway protocol session or the second colored border gateway protocol session.

DETAILED DESCRIPTION

The following detailed description of example implementations refers to the accompanying drawings. The same reference numbers in different drawings may identify the same or similar elements.

Data center fabrics (e.g., provided by network devices) may utilize BGP for underlay routing and for overlay signaling. Traditionally, best effort Internet protocol (IP) routing is done in the underlay to carry the overlay traffic. As the types of data center traffic increase, mapping different types of traffic to different logical fabrics (e.g., for a service with different service level agreements (SLAs)) becomes increasingly important. Currently, BGP underlay routing follows BGP path selection rules that cause traffic to be routed over shortest paths towards a destination. BGP underlay routing fails to enable routing of different types of traffic over different subsets of links (e.g., different logical fabrics). Providing different SLAs in data centers for traffic (e.g., machine learning data, media broadcast data, and/or the like) is limited by the traditional underlay BGP routing. Thus, current techniques for routing traffic by data centers consume computing resources (e.g., processing resources, memory resources, communication resources, and/or the like), networking resources, and/or the like, associated with failing to enable routing of different types of traffic over different routes based on traffic type, failing to provide different SLAs for traffic routed by a data center, providing poor user experience for traffic routed by a data center, and/or the like.

Some implementations described herein relate to a network device that provides BGP deterministic path forwarding. For example, the network device may originate a route, and may designate the route as a first colored route having a first color. The network device may advertise the first colored route to a first intermediate network device to cause the first intermediate network device to propagate the first colored route to an ingress network device over a first colored border gateway protocol session. The network device may designate the route as a second colored route having a second color, and may advertise the second colored route to a second intermediate network device to cause the second intermediate network device to propagate the second colored route to the ingress network device over a second colored border gateway protocol session.

In this way, the network device provides BGP deterministic path forwarding. For example, the network device may color (e.g., prioritize) each BGP session based on a color (e.g., a priority) of a logic fabric to which the BGP session belongs, and may color transport tunnel end point routes with color communities. The network device may advertise a colored route over a colored BGP session if the colors of the route overlaps the colors of the BGP session. The colors of the route which do not match any of the colors of the BGP session will be pruned when advertising over the BGP session. A tunnel end point route propagated over multiple logic fabrics using this approach may include multiple BGP routes (e.g., for a same prefix) at a tunnel ingress. The color(s) of each BGP route may represent the fabric(s) that a tunnel will traverse. By mapping traffic to a BGP tunnel route with a certain color, the network device may ensure that traffic will flow over the logic fabric with that color. Thus, the network device conserves computing resources, networking resources, and/or the like that would otherwise have been consumed by failing to enable routing of different types of traffic over different routes based on traffic type, failing to provide different SLAs for traffic routed by a data center, providing poor user experience for traffic routed by a data center, and/or the like.

Furthermore, the network device may color BGP sessions to enable colored transport to be extended to hop-by-hop BGP routing. This precludes interior gateway protocol (IGP) colored transport and reduces the quantity of protocols customers need to manage an Internet protocol (IP) fabric. The network device may enable automatic logic fabric discovery via a wildcard color (or no color) with explicitly configuring colors at a tunnel egress network device. A tunnel ingress network device may automatically determine which logic fabrics to utilize to reach the tunnel egress network device as the route when a wildcard color is propagated from egress network device to the ingress network device (e.g., which simplifies customer provisioning). The network device may provide pure IP and/or IPv6 prefixes for colored transport, which simplifies fabric management and benefits customers that prefer pure IP and/or IPv6 prefixes.

FIGS. 1A-1F are diagrams of an example 100 associated with providing BGP deterministic path forwarding. As shown in FIGS. 1A-1F, example 100 includes a user device and a server device associated with a network of network devices. Further details of the user device, the server device, the network, and the network devices are provided elsewhere herein.

Figure 1A:
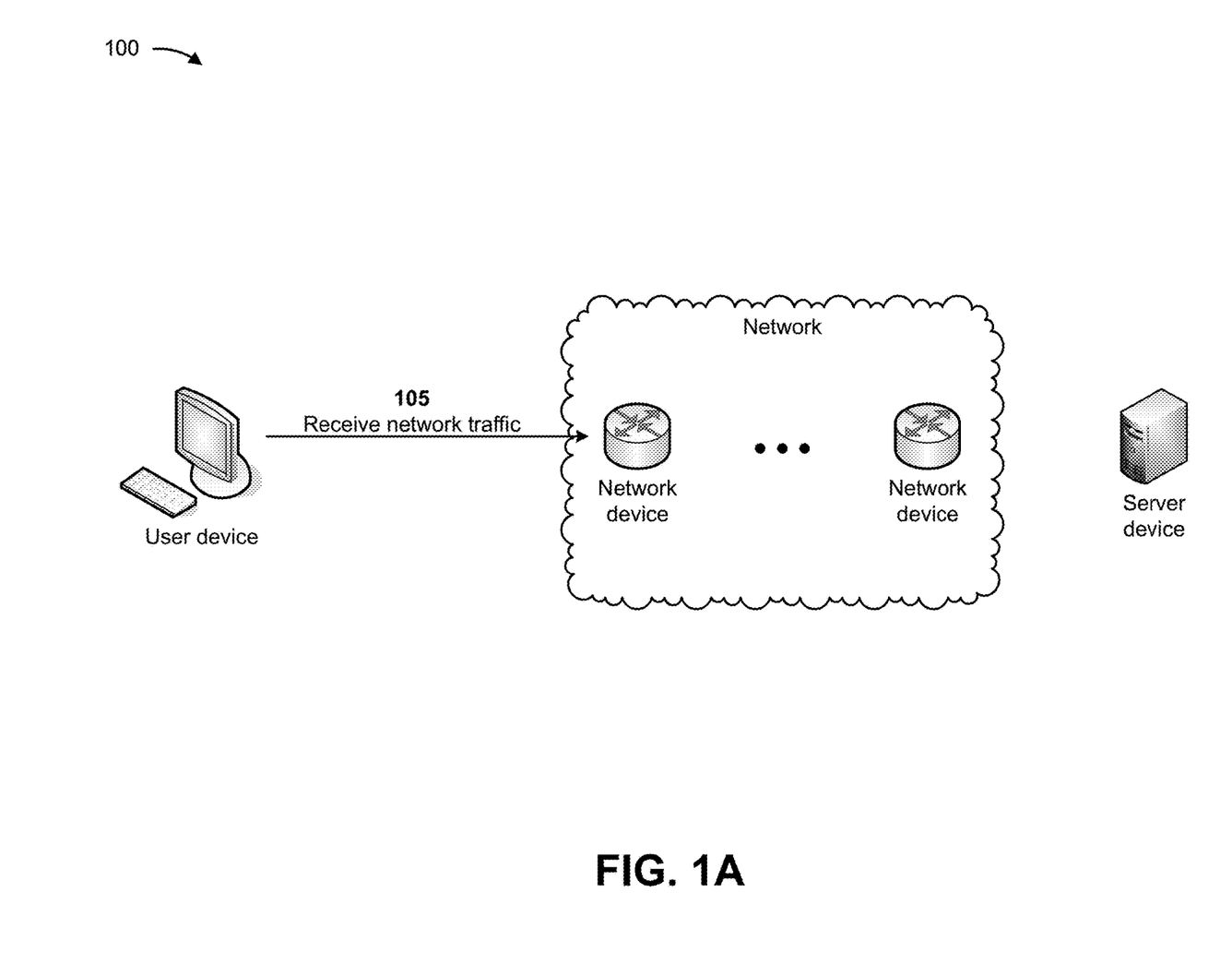
FIGS. 1A-1F are diagrams of an example associated with providing BGP deterministic path forwarding.

As shown in FIG. 1A, and by reference number 105, the network device may receive network traffic from the user device. For example, the user device and the server device may utilize the network of the network devices to exchange network traffic (e.g., packets). In some implementations, the user device may generate network traffic destined for the server device, and may provide the network traffic to the network via the network device. The network device may receive the network traffic and may forward the network traffic to the server device directly or via one or more of the other network devices.

Figure 1B:
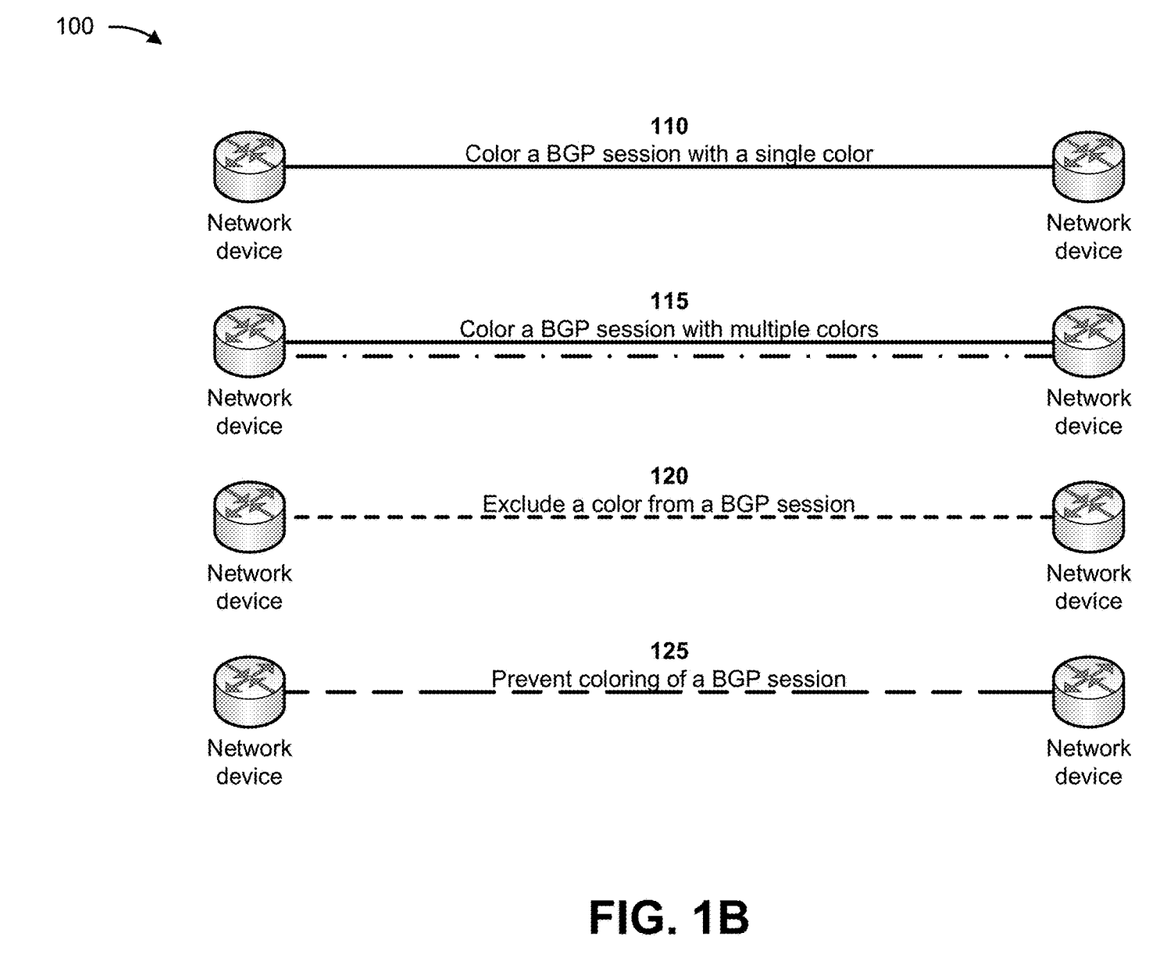

As shown in FIG. 1B, and by reference number 110, the network devices may color a BGP session with a single color. For example, when an egress network device originates an underlay BGP route, the egress network device may color the underlay BGP route with one or more colors associated with a color community. A color is a preference value for a static route, an aggregate route, a generated route, and/or the like. A primary route preference may be specified by including a first color statement in a configuration, and a secondary route preference may be specified by including a second color statement in the configuration. In some implementations, if a route is not colored, the route may be applicable to all colors. The egress network device may color an underlay BGP session to represent a color of an underlying logical fabric of network devices. In some implementations, the egress network device may color a route with one or more colors. In such implementations, the egress network device may advertise only routes with the color matching the BGP session and may prune additional colors for the routes.

As further shown in FIG. 1B, and by reference number 115, the network devices may color a BGP session with multiple colors. For example, the egress network device may color routes with multiple colors, and may advertise only routes with at least one of the multiple colors for the BGP session. The egress network device may prune additional colors (e.g., not included in the multiple colors) for the routes.

As further shown in FIG. 1B, and by reference number 120, the network devices may exclude a color from a BGP session. For example, the egress network device may exclude one or more colors for routes of a BGP session, and may advertise only routes with colors, other than the excluded one or more colors, for the BGP session. The egress network device may prune the excluded one or more colors for the routes.

As further shown in FIG. 1B, and by reference number 125, one or more network devices may prevent coloring of a BGP session. For example, the egress network device may prevent colors for routes of a BGP session, and may advertise all routes for the BGP session. The egress network device may not prune colors of routes for the BGP session.

Figure 1C:
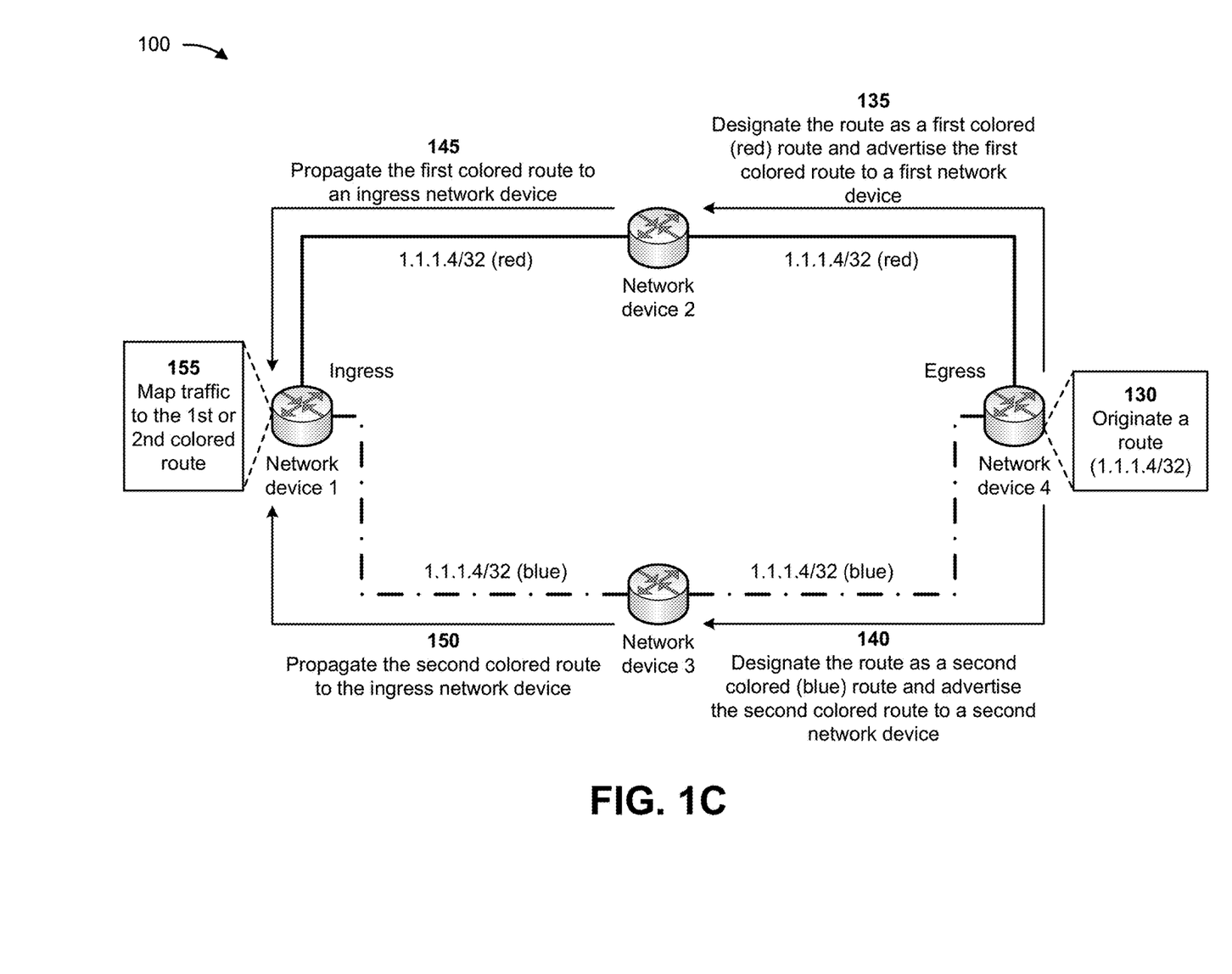

As shown in FIG. 1C, a first network device (e.g., network device 1) may be an ingress network device, a second network device (e.g., network device 2) and a third network device (e.g., network device 3) may be intermediate network devices, and a fourth network device (e.g., network device 4) may be an egress network device. Four network devices are depicted in the example network of FIG. 1C for simplicity. In some implementations, one or more additional ingress network devices, intermediate network devices, and/or egress network devices may be included in the example network.

As further shown in FIG. 1C, and by reference number 130, the egress network device (e.g., network device 4) may originate a route (e.g., 1.1.1.4/32). For example, when the route is originated from the egress network device, the egress network device may initially not designate a color for the route.

As further shown in FIG. 1C, and by reference number 135, the egress network device may prune the route as a first colored (e.g., red) route and may advertise the first colored route to a first network device (e.g., network device 2) over the first colored BGP session. For example, the egress network device may designate the route as a first colored route having a first color (e.g., a first preference value for the route, such as red). In some implementations, the egress network device may advertise the first colored route to one of the intermediate network devices, such as a first intermediate network device (e.g., network device 2).

As further shown in FIG. 1C, and by reference number 140, the egress network device may prune the route as a second colored (e.g., blue) route and may advertise the second colored route to a second network device (e.g., network device 3) over the second colored BGP session. For example, the egress network device may designate the route as a second colored route having a second color (e.g., a second preference value for the route, such as blue) that is different than the first color. In some implementations, the egress network device may advertise the second colored route to one of the intermediate network devices, such as the second intermediate network device (e.g., network device 3).

As further shown in FIG. 1C, and by reference number 145, the first network device (e.g., network device 2) may propagate the first colored route to the ingress network device. For example, when the first intermediate network device (e.g., network device 2) receives the first colored route from the egress network device, the first intermediate network device may advertise the first colored route to the ingress network device (e.g., network device 1) over the first colored BGP session. Alternatively, if additional intermediate network devices (e.g., of the first colored route) are provided before the ingress network device, the first intermediate network device may advertise the first colored route to a next hop intermediate network device if the BGP session is also colored with the first color. Each of the additional intermediate network devices may receive the first colored route and may advertise the first colored route to a next hop intermediate network device over a first colored BGP session until the first colored route is advertised to the ingress network device.

As further shown in FIG. 1C, and by reference number 150, the second network device (e.g., network device 3) may propagate the second colored route to the ingress network device. For example, when the second intermediate network device (e.g., network device 3) receives the second colored route from the egress network device, the second intermediate network device may advertise the second colored route to the ingress network device (e.g., network device 1) over the second colored BGP session. Alternatively, if additional intermediate network devices (e.g., of the second colored route) are provided before the ingress network device, the second intermediate network device may advertise the second colored route to a next hop intermediate network device if the BGP session is also colored with the second color. Each of the additional intermediate network devices may receive the second colored route and may advertise the second colored route to a next hop intermediate network device over a second colored BGP session until the second colored route is advertised to the ingress network device.

As further shown in FIG. 1C, and by reference number 155, the ingress network device may map the network traffic to the first colored route and/or the second colored route. For example, after the first colored route and the second colored route are advertised to the ingress network device, the ingress network device may include two routes for the originated route (e.g., 1.1.1.4/32), the first colored route colored with the first color and the second colored route colored with the second color. The ingress network device may store the two routes in a data structure (e.g., a database, a table, a list, and/or the like) associated with the ingress network device. In some implementations, the ingress network device may utilize the first colored route or the second colored route for ingress traffic (e.g., service traffic) to be provisioned by the ingress network device. For example, the ingress network device may map ingress traffic to either a first colored tunnel (e.g., the first colored route) or a second colored tunnel (e.g., the second colored route) based on provisioning.

In some implementations, the ingress network device may utilize a BGP-labeled unicast (LU) tunnel for mapping the ingress traffic. A BGP-LU tunnel may be supported in the control plane and the data plane, and may provide a light overhead tunnel. The BGP-LU tunnel may be utilized with IP version 4 (IPv4) and IP version 6 (IPv6) underlay routing. In some implementations, the ingress network device may utilize a BGP segment routing version 6 (SRv6) tunnel for mapping ingress traffic. A BGP SRv6 tunnel may be supported in the data plane and may be supported in the control plane with modifications. The BGP SRv6 tunnel may provide a heavier overhead tunnel and may be utilized with IPv6 underlay routing. In some implementations, the ingress network device may utilize an IP-in-IP (IPIP)/generic routing encapsulation (GRE) tunnel for mapping ingress traffic. The IPIP/GRE tunnel may be utilized with IPv4 and IPv6 underlay routing. The ingress network device may ensure that the ingress traffic is mapped correctly via the IPIP/GRE tunnel for next hop network devices, and intermediate network devices may utilize additional information (e.g., differentiated services code point (DSCP) codes) to map the ingress traffic to correct logic fabrics.

Figure 1D:
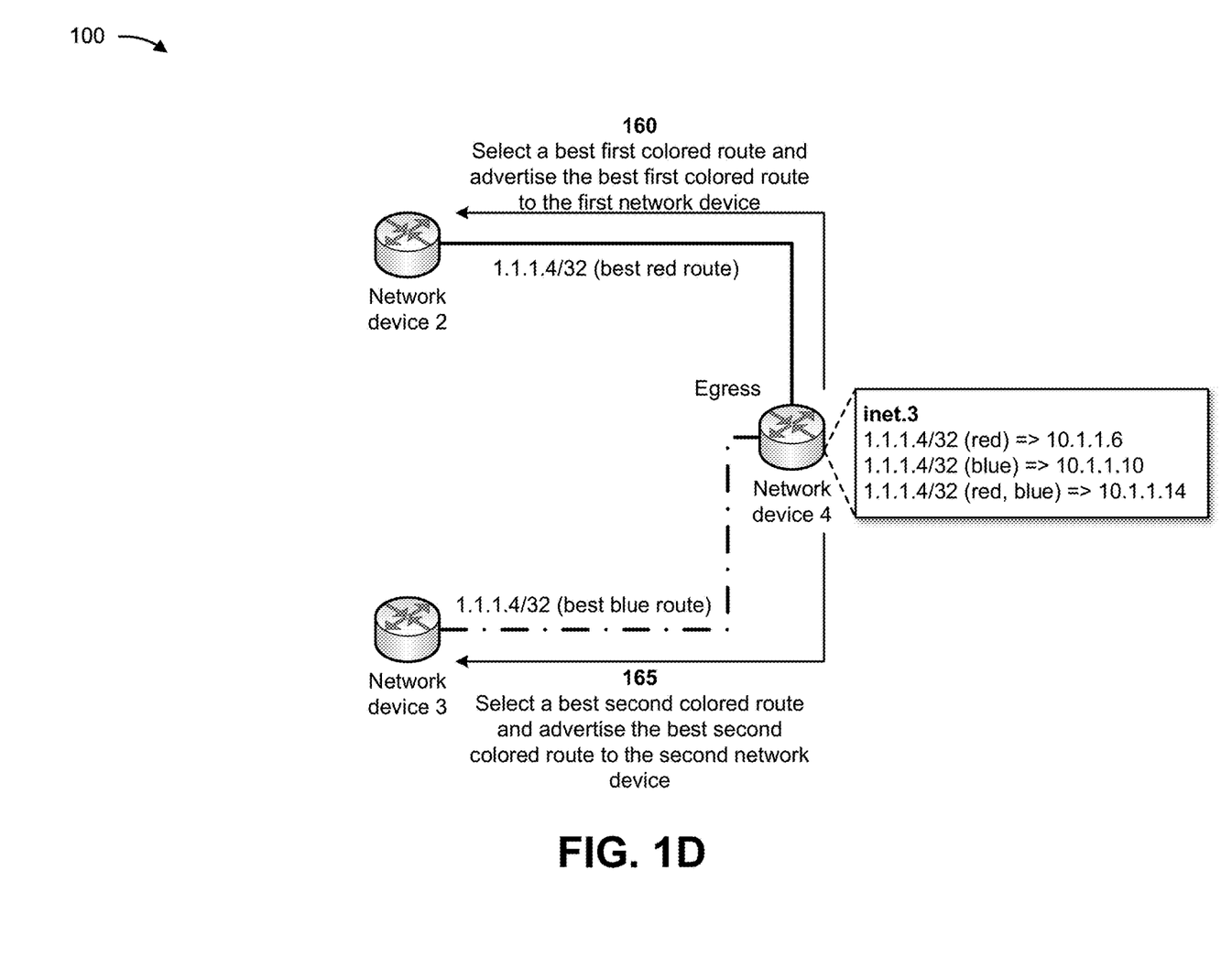

As shown in FIG. 1D, the egress network device may designate a route (e.g., 1.1.1.4/32) as a first colored (red) route (e.g., next-hop 10.1.1.6), a second colored (e.g., blue) route (e.g., next-hop 10.1.1.10), a multicolored (e.g., red and blue) route (e.g., next-hop 10.1.1.14), and/or the like. For example, the egress network device may designate the route (e.g., 1.1.1.4/32) as a first colored route (e.g., next-hop 10.1.1.6) having a first color (e.g., a first preference value for the route, such as red). In some implementations, when designating the route as the first colored route, the egress network device may select, from a plurality of first colored routes, a best first colored route as the first colored route.

Alternatively, or additionally, the egress network device may designate the route (e.g., 1.1.1.4/32) as a second colored route (e.g., next-hop 10.1.1.10) having a second color (e.g., a second preference value for the route, such as blue) different than the first color. In some implementations, when designating the route as the second colored route, the egress network device may select, from a plurality of second colored routes, a best second colored route as the second colored route.

Alternatively, or additionally, the egress network device may designate the route (e.g., 1.1.1.4/32) as a multicolored route (e.g., next-hop 10.1.1.14) having the first color and the second color. In some implementations, when designating the route as the multicolored route, the egress network device may select, from a plurality of first colored routes, a best first colored route as the multicolored route having the first color, and may select, from a plurality of second colored routes, a best second colored route as the multicolored route having the second color.

As further shown in FIG. 1D, and by reference number 160, the egress network device may select a best first colored route and may advertise the best first colored route to the first network device. For example, as described above, when designating the route as the first colored route, the egress network device may select, from a plurality of first colored routes, a best first colored route as the first colored route. In some implementations, the egress network device may advertise the best first colored route to one of the intermediate network devices, such as a first intermediate network device (e.g., network device 2) over the first colored BGP session.

As further shown in FIG. 1D, and by reference number 165, the egress network device may select a best second colored route and may advertise the best second colored route to the second network device. For example, as described above, when designating the route as the second colored route, the egress network device may select, from a plurality of second colored routes, a best second colored route as the second colored route. In some implementations, the egress network device may advertise the best second colored route to one of the intermediate network devices, such as the second intermediate network device (e.g., network device 3) over the second colored BGP session.

Figure 1E:
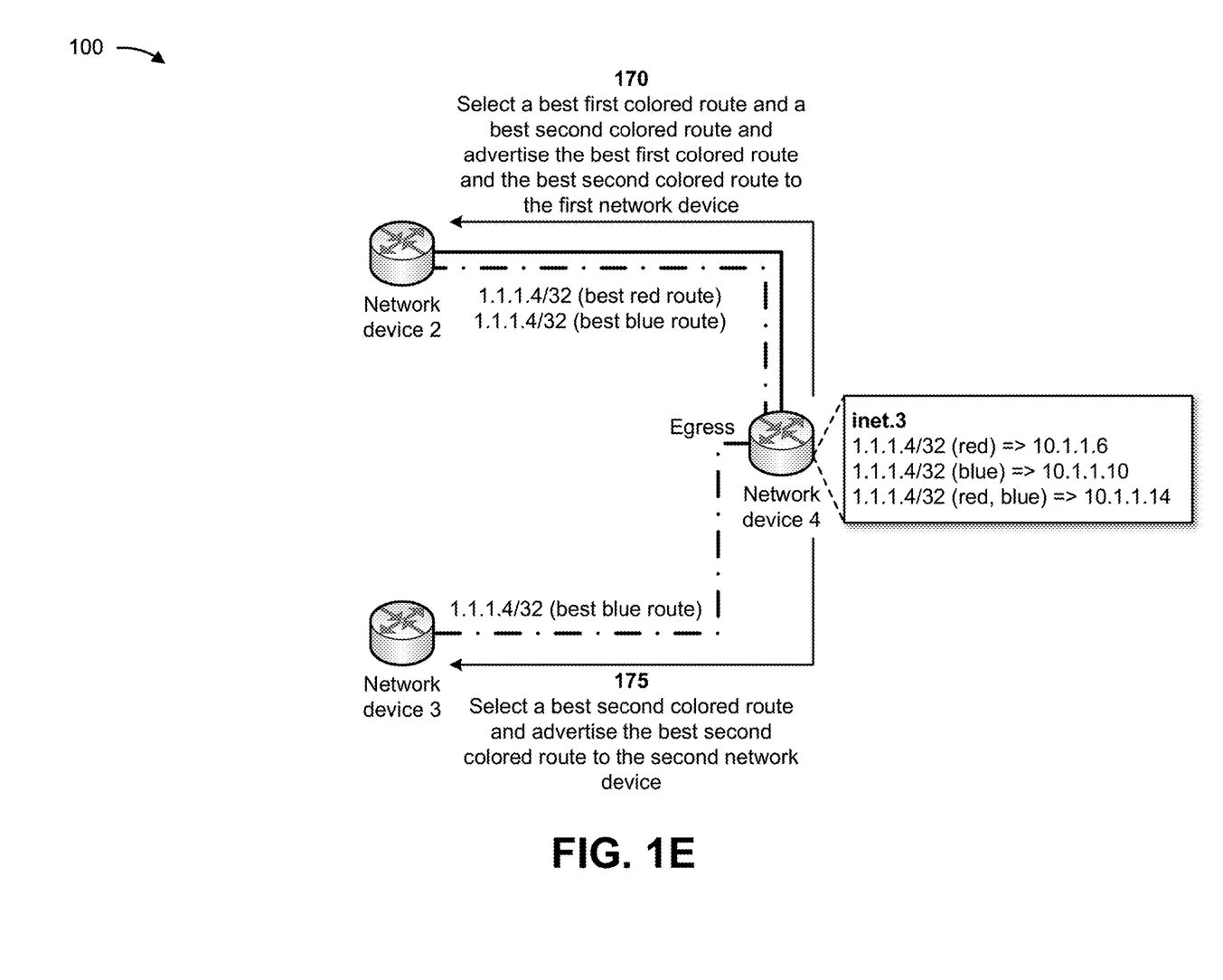

As shown in FIG. 1E, and by reference number 170, the egress network device may select a best first colored route and a best second colored route and may advertise the best first colored route and the best second colored route to the first network device. For example, as described above, when designating the route as the multicolored route, the egress network device may select, from a plurality of first colored routes, a best first colored route as the multicolored route having the first color, and may select, from a plurality of second colored routes, a best second colored route as the multicolored route having the second color. In some implementations, the egress network device may advertise the best first colored route and the best second colored route to one of the intermediate network devices, such as a first intermediate network device (e.g., network device 2) over the EBGP session which is colored with both the first color and the second color. In some implementations, the egress network device may advertise the best first colored route and the best second colored route to one of the intermediate network devices with a first add-path identifier (e.g., for the best first colored route) and a second add-path identifier (e.g., for the best second colored route).

As further shown in FIG. 1E, and by reference number 175, the egress network device may select a best second colored route and may advertise the best second colored route to the second network device. For example, as described above, when designating the route as the second colored route, the egress network device may select, from a plurality of second colored routes, a best second colored route as the second colored route. In some implementations, the egress network device may advertise the best second colored route to one of the intermediate network devices, such as the second intermediate network device (e.g., network device 3) over a second colored BGP session.

Figure 1F:
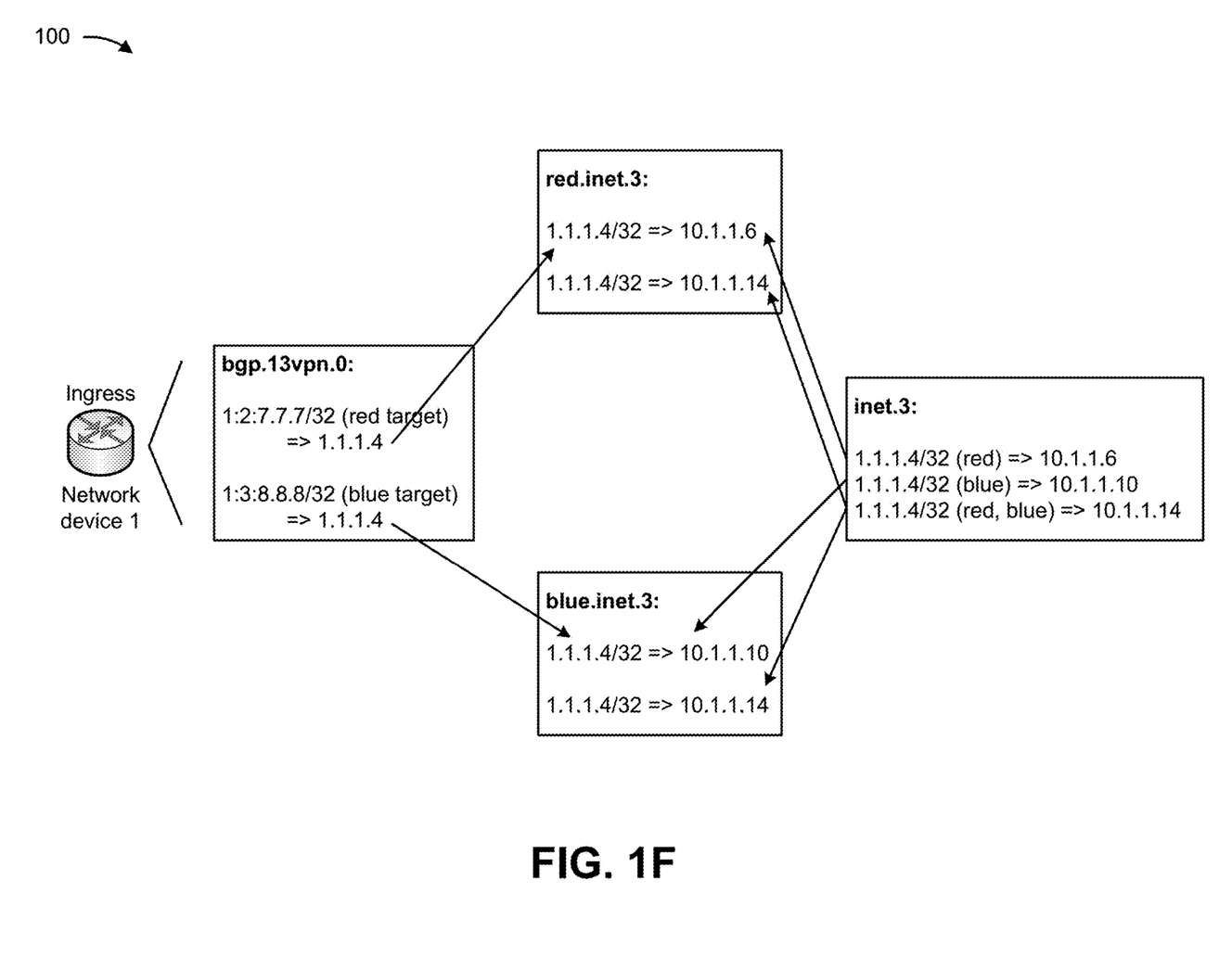

As shown in FIG. 1F, the ingress network device may include multiple transport class tables, and may utilize the multiple transport class tables for mapping traffic. For example, the ingress network device may import and store routes with different colors to different multiple transport class tables for service traffic mapping. In some implementations, the ingress network device may include a first transport class table (e.g., an inet.3 table) that includes a route (e.g., 1.1.1.4/32) as a first colored (red) route (e.g., next-hop 10.1.1.6), a second colored (e.g., blue) route (e.g., next-hop 10.1.1.10), a multicolored (e.g., red and blue) route (e.g., next-hop 10.1.1.14), and/or the like. The ingress network device may include a second transport class table (e.g., a red.inet.3 table) that includes the route (e.g., 1.1.1.4/32) as the first colored (red) route (e.g., next-hop 10.1.1.6) and the multicolored (e.g., red and blue) route (e.g., next-hop 10.1.1.14). The ingress network device may include a third transport class table (e.g., a blue.inet.3 table) that includes the route (e.g., 1.1.1.4/32) as the second colored (blue) route (e.g., next-hop 10.1.1.10) and the multicolored (e.g., red and blue) route (e.g., next-hop 10.1.1.14). The ingress network device may include a service route table (e.g., a bgp.l3vpn.0 table) that includes a route (e.g., 1:2:7.7.7/32 a red target) associated with the first colored (red) route (e.g., next-hop 10.1.1.6) and/or the multicolored (e.g., red and blue) route (e.g., next-hop 10.1.1.14) of the second transport class table. The service route table may include another route (e.g., 1:3:8.8.8/32 a blue target) associated with the second colored (blue) route (e.g., next-hop 10.1.1.10) and/or the multicolored (e.g., red and blue) route (e.g., next-hop 10.1.1.14) of the third transport class table.

In some implementations, the egress network device may advertise the colored routes described herein via IPv4 and/or IPv6 prefixes that are typically utilized in data centers. Alternatively, or additionally, the egress network device may advertise the colored routes described herein via BGP-classful transport (CT)/BGP-color aware routing (CAR) prefixes. The egress network device may utilize colored BGP sessions to achieve end-to-end color transport, and may utilize a wildcard color to achieve automatic logic fabric discovery.

In this way, the network device provides BGP deterministic path forwarding. For example, the network device may color each BGP session based on a color of a logic fabric to which the BGP session belongs, and may color transport tunnel end point routes with color communities. The network device may advertise a colored route over a colored BGP session if the color of the route overlaps the color of the BGP session. A tunnel end point route propagated over multiple logic fabrics using this approach may include multiple BGP routes (e.g., for a same prefix) at a tunnel ingress. The color(s) of each BGP route may represent the fabric(s) a tunnel will traverse. By mapping traffic to a BGP tunnel route with a certain color, the network device may ensure that traffic will flow over the logic fabric with that color. Thus, the network device conserves computing resources, networking resources, and/or the like that would otherwise have been consumed by failing to enable routing of different types of traffic over different routes based on traffic type, failing to provide different SLAs for traffic routed by a data center, providing poor user experience for traffic routed by a data center, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
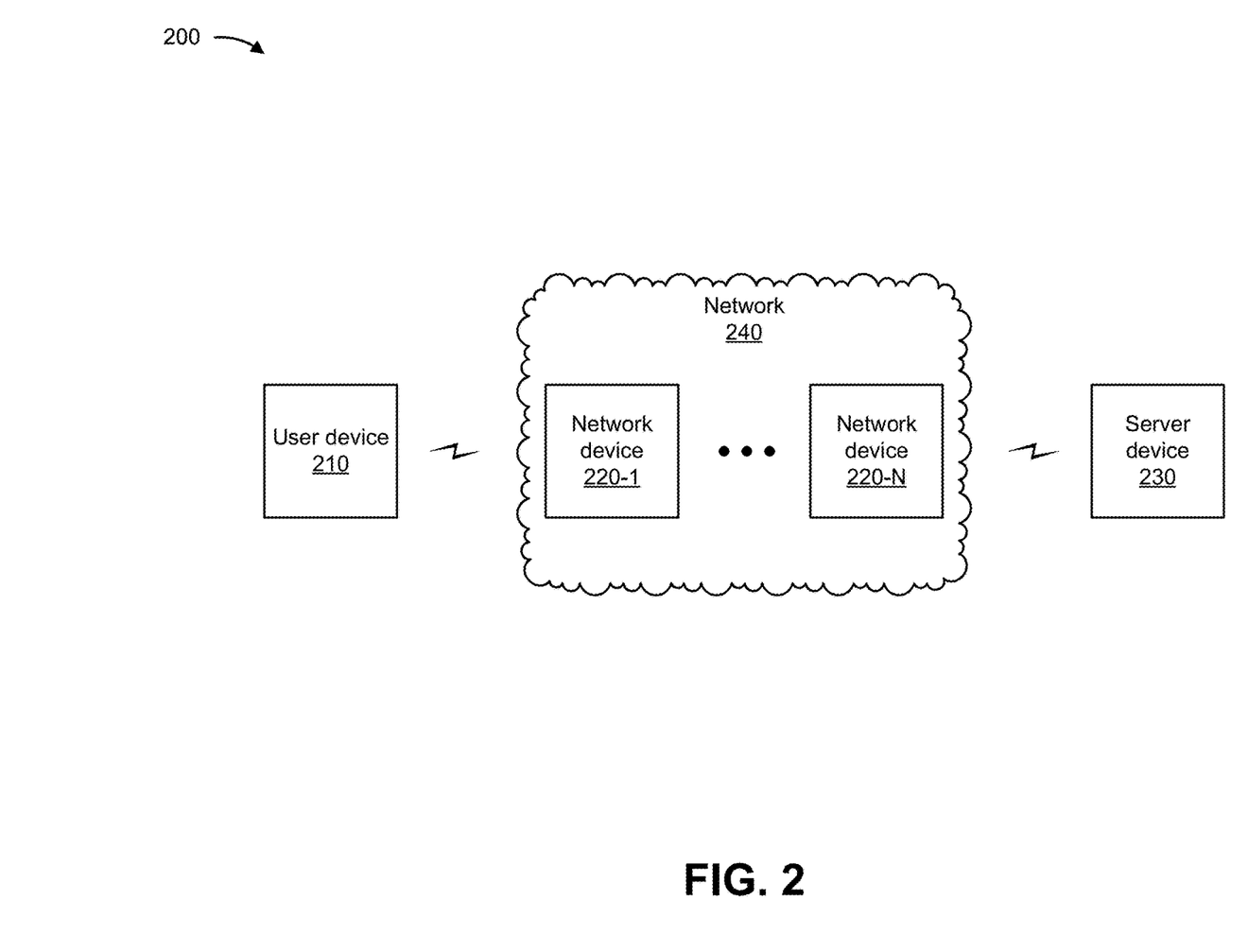
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a group of network devices 220 (shown as network device 220-1 through network device 220-N), a server device 230, and a network 240. Devices of the environment 200 may interconnect via wired connections, wireless connections, or a combination of wired and wireless connections.

The user device 210 may include one or more devices capable of receiving, generating, storing, processing, and/or providing information, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
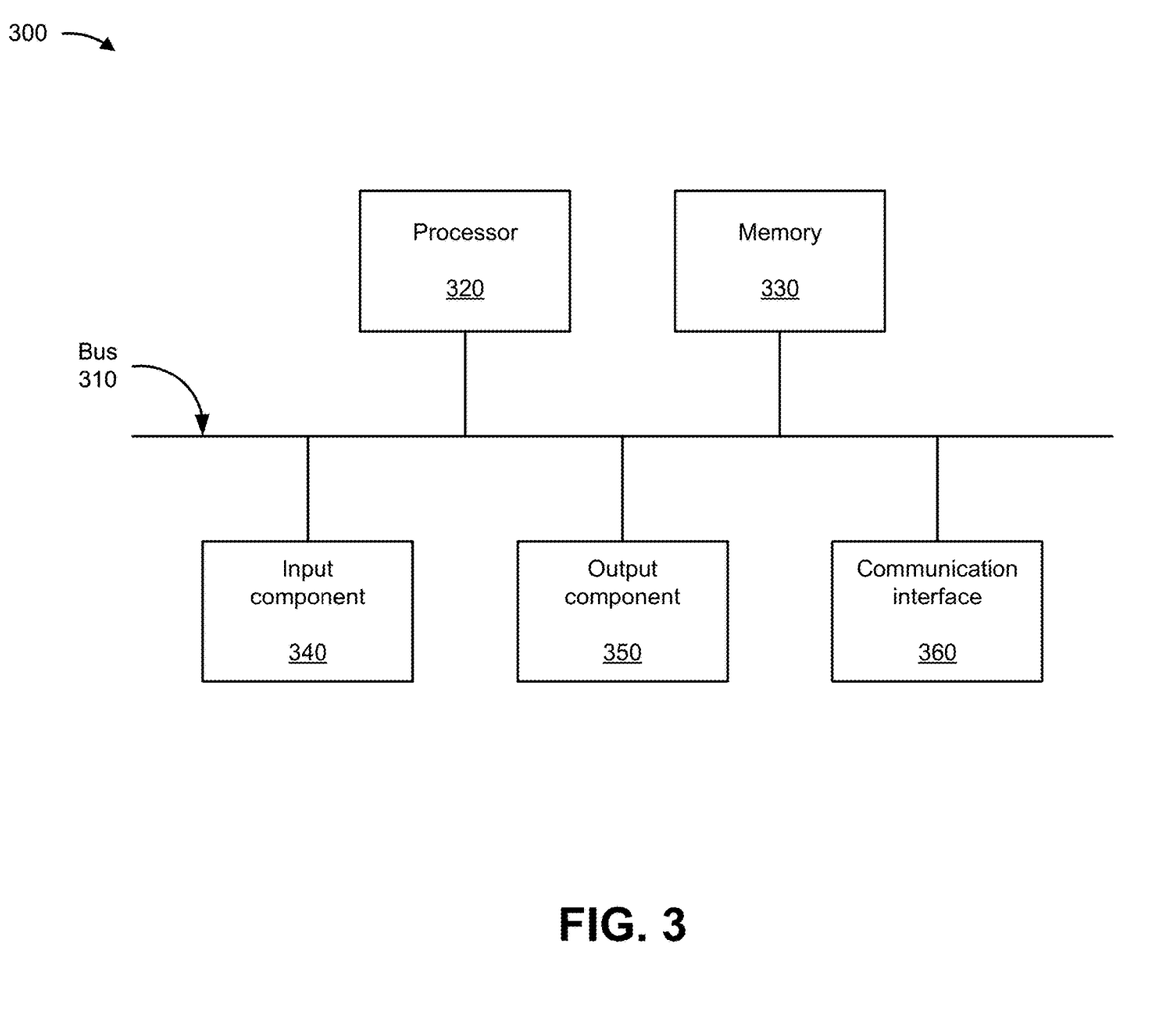
FIGS. 3 and 4 are diagrams of example components of one or more devices of FIG. 2.

FIG. 3 is a diagram of example components of one or more devices of FIG. 2. The example components may be included in a device 300, which may correspond to the user device 210, the network device 220, and/or the server device 230. In some implementations, the user device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
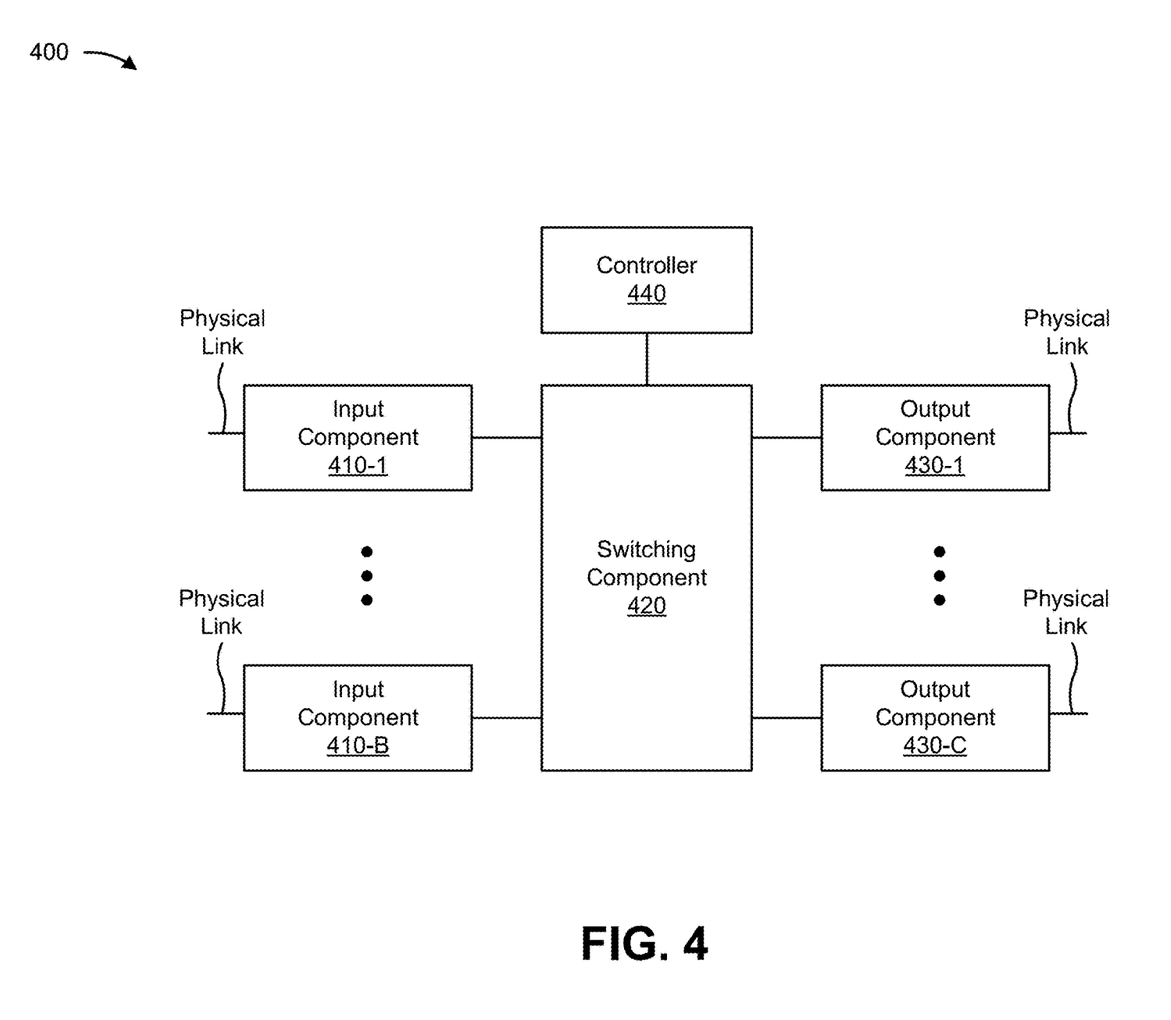

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
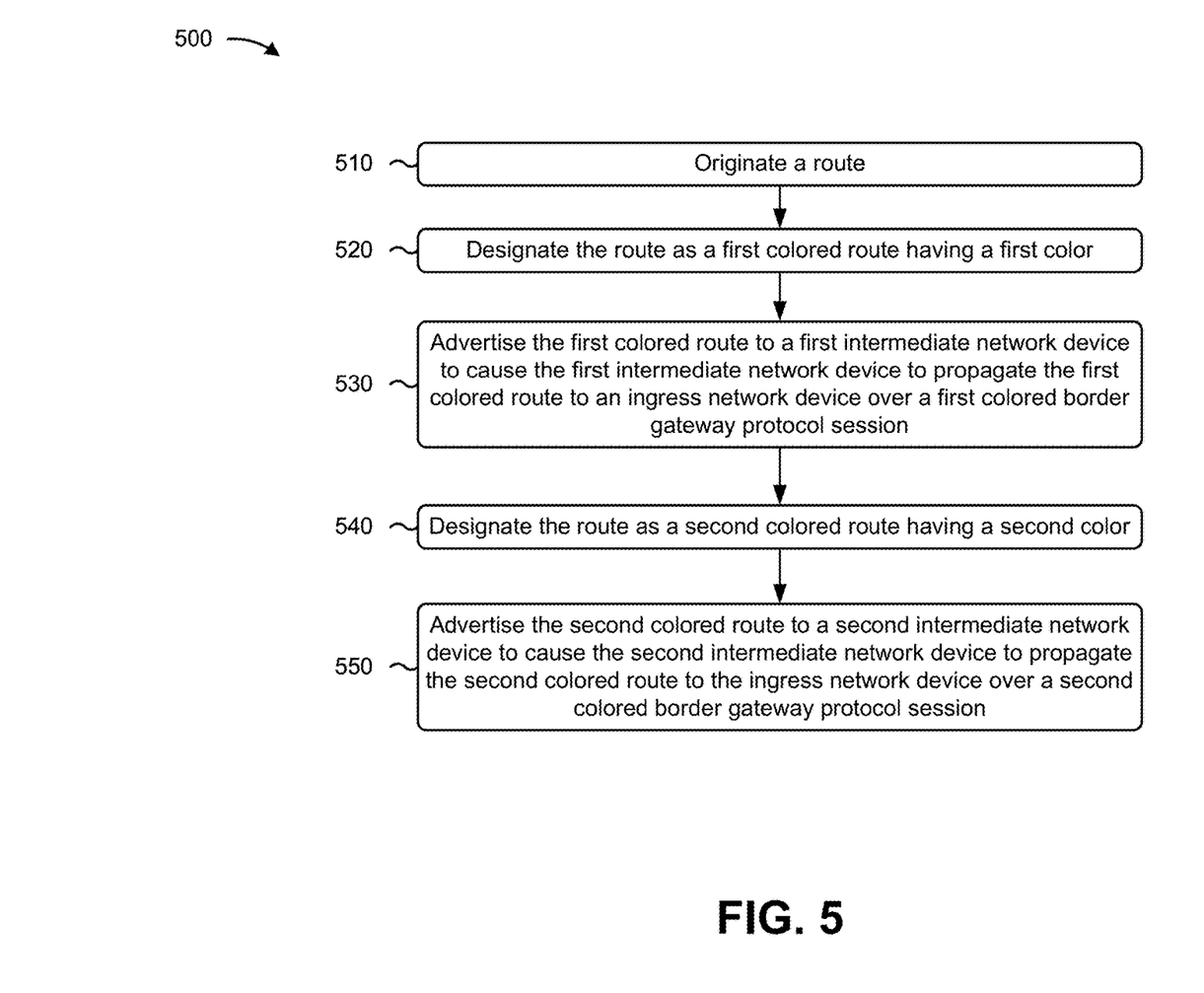
FIG. 5 is a flowchart of an example process for providing BGP deterministic path forwarding.

FIG. 5 is a flowchart of an example process 500 for providing BGP deterministic path forwarding. In some implementations, one or more process blocks of FIG. 5 may be performed by a network device (e.g., the network device 220). In some implementations, one or more process blocks of FIG. 5 may be performed by another device or a group of devices separate from or including the network device. Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include originating a route (block 510). For example, the network device may originate a route, as described above.

As further shown in FIG. 5, process 500 may include designating the route as a first colored route having a first color (block 520). For example, the network device may designate the route as a first colored route having a first color, as described above. In some implementations, designating the route as the first colored route includes selecting, from a plurality of first colored routes, a best first colored route as the first colored route.

As further shown in FIG. 5, process 500 may include advertising the first colored route to a first intermediate network device to cause the first intermediate network device to propagate the first colored route to an ingress network device over a first colored border gateway protocol session (block 530). For example, the network device may advertise the first colored route to a first intermediate network device to cause the first intermediate network device to propagate the first colored route to an ingress network device over a first colored border gateway protocol session, as described above. In some implementations, advertising the first colored route to the first intermediate network device includes utilizing Internet protocol version 4 or Internet protocol version 6 prefixes to advertise the first colored route to the first intermediate network device.

As further shown in FIG. 5, process 500 may include designating the route as a second colored route having a second color (block 540). For example, the network device may designate the route as a second colored route having a second color, as described above. In some implementations, designating the route as the second colored route includes selecting, from a plurality of second colored routes, a best second colored route as the second colored route.

As further shown in FIG. 5, process 500 may include advertising the second colored route to a second intermediate network device to cause the second intermediate network device to propagate the second colored route to the ingress network device over a second colored border gateway protocol session (block 550). For example, the network device may advertise the second colored route to a second intermediate network device to cause the second intermediate network device to propagate the second colored route to the ingress network device over a second colored border gateway protocol session, as described above. In some implementations, the ingress network device includes multiple transport class tables, and is configured to utilize the multiple transport class tables for mapping traffic. In some implementations, the ingress network device is configured to map traffic to one of the first colored route or the second colored route. In some implementations, advertising the second colored route to the second intermediate network device includes utilizing Internet protocol version 4 or Internet protocol version 6 prefixes to advertise the second colored route to the second intermediate network device.

In some implementations, process 500 includes designating the route as a multicolored route having multiple colors, and advertising the multicolored route to one of the first intermediate network device or the second intermediate network device. In some implementations, process 500 includes selecting a best first colored route from a plurality of first colored routes, selecting a best second colored route from a plurality of second colored routes, and advertising the best first colored route and the best second colored route to one of the first intermediate network device or the second intermediate network device.

In some implementations, process 500 includes advertising and pruning one of the first colored route or the second colored route over a colored border gateway protocol session based on color overlapping. In some implementations, process 500 includes advertising and pruning the first colored route and the second colored route over a colored border gateway protocol session based on color overlapping.

In some implementations, process 500 includes precluding advertisement of the first colored route or the second colored route over a colored border gateway protocol session when the first colored route and the second colored fail to include color overlap. In some implementations, process 500 includes precluding advertisement of the first colored route and the second colored route over a colored border gateway protocol session when the first colored route and the second colored fail to include color overlap.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
originating, by a network device, a route;
pruning, by the network device, the route as a first colored route having a first color;
wherein a color was not initially designated for the route;
designating, by the network device, the route as the first colored route having the first color;
advertising, by the network device, the first colored route to a first intermediate network device to cause the first intermediate network device to propagate the first colored route to an ingress network device over a first colored border gateway protocol session,
wherein the first color belongs to the first colored border gateway protocol session;
designating, by the network device, the route as a second colored route having a second color; and
advertising, by the network device, the second colored route to a second intermediate network device to cause the second intermediate network device to propagate the second colored route to the ingress network device over a second colored border gateway protocol session.

2. The method of claim 1, further comprising:
designating the route as a multicolored route having multiple colors; and
advertising the multicolored route to one of the first intermediate network device or the second intermediate network device.

3. The method of claim 1, wherein designating the route as the first colored route comprises:
selecting, from a plurality of first colored routes, a best first colored route as the first colored route.

4. The method of claim 1, wherein designating the route as the second colored route comprises:
selecting, from a plurality of second colored routes, a best second colored route as the second colored route.

5. The method of claim 1, further comprising:
selecting a best first colored route from a plurality of first colored routes;
selecting a best second colored route from a plurality of second colored routes; and
advertising the best first colored route and the best second colored route to one of the first intermediate network device or the second intermediate network device.

6. The method of claim 1, further comprising:
advertising and pruning one of the first colored route or the second colored route over a colored border gateway protocol session based on color overlapping.

7. The method of claim 1, further comprising:
advertising and pruning the first colored route and the second colored route over a colored border gateway protocol session based on color overlapping.

8. A network device, comprising:
one or more memories; and
one or more processors to:
originate a route;
prune the route as a first colored route having a first color,
wherein a color was not initially designated for the route;
designate the route as the first colored route having the first color and selected from a plurality of first colored routes;
advertise the first colored route to a first intermediate network device to cause the first intermediate network device to propagate the first colored route to an ingress network device over a first colored border gateway protocol session,
wherein the first color belongs to the first colored border gateway protocol session;
designate the route as a second colored route having a second color and selected from a plurality of second colored routes; and
advertise the second colored route to a second intermediate network device to cause the second intermediate network device to propagate the second colored route to the ingress network device over a second colored border gateway protocol session.

9. The network device of claim 8, wherein the one or more processors are further to:
preclude advertisement of the first colored route or the second colored route over a colored border gateway protocol session when the first colored route and the second colored route fail to include color overlap.

10. The network device of claim 8, wherein the ingress network device includes multiple transport class tables, and is configured to utilize the multiple transport class tables for mapping traffic.

11. The network device of claim 8, wherein the ingress network device is configured to map traffic to one of the first colored route or the second colored route.

12. The network device of claim 8, wherein the one or more processors, to advertise the first colored route to the first intermediate network device, are to:
utilize Internet protocol version 4 or Internet protocol version 6 prefixes to advertise the first colored route to the first intermediate network device.

13. The network device of claim 8, wherein the one or more processors, to advertise the second colored route to the second intermediate network device, are to:
utilize Internet protocol version 4 or Internet protocol version 6 prefixes to advertise the second colored route to the second intermediate network device.

14. A non-transitory computer-readable medium storing a set of instructions, the set of instructions comprising:
one or more instructions that, when executed by one or more processors of a network device, cause the network device to:
originate a route;
prune the route as a first colored route having a first color,
wherein a color was not initially designated for the route;
designate the route as a first colored route having a first color;

advertise the first colored route to a first intermediate network device to cause the first intermediate network device to propagate the first colored route to an ingress network device over a first colored border gateway protocol session,
wherein the first color belongs to the first colored border gateway protocol session;
designate the route as a second colored route having a second color;
advertise the second colored route to a second intermediate network device to cause the second intermediate network device to propagate the second colored route to the ingress network device over a second colored border gateway protocol session;
designate the route as a multicolored route having multiple colors; and
advertise the multicolored route to one of the first intermediate network device or the second intermediate network device over the first colored border gateway protocol session or the second colored border gateway protocol session.

15. The non-transitory computer-readable medium of claim 14, wherein the one or more instructions further cause the network device to:
select a best first colored route from a plurality of first colored routes;
select a best second colored route from a plurality of second colored routes; and
advertise the best first colored route and the best second colored route to one of the first intermediate network device or the second intermediate network device.

16. The non-transitory computer-readable medium of claim 14, wherein the one or more instructions further cause the network device to:
advertise and prune one of the first colored route or the second colored route over a colored border gateway protocol session based on color overlapping.

17. The non-transitory computer-readable medium of claim 14, wherein the one or more instructions further cause the network device to:
advertise and prune the first colored route and the second colored route over a colored border gateway protocol session based on color overlapping.

18. The non-transitory computer-readable medium of claim 14, wherein the one or more instructions, that cause the network device to advertise the first colored route to the first intermediate network device, cause the network device to:
utilize Internet protocol version 4 or Internet protocol version 6 prefixes to advertise the first colored route to the first intermediate network device.

19. The non-transitory computer-readable medium of claim 14, wherein the one or more instructions, that cause the network device to advertise the second colored route to the second intermediate network device, cause the network device to:
utilize Internet protocol version 4 or Internet protocol version 6 prefixes to advertise the second colored route to the second intermediate network device.

20. The network device of claim 8, wherein the one or more processors are further to:
select a best first colored route from a plurality of first colored routes;
select a best second colored route from a plurality of second colored routes; and
advertise the best first colored route and the best second colored route to one of the first intermediate network device or the second intermediate network device.

* * * * *